(12) United States Patent
Persson et al.

(10) Patent No.: US 12,123,487 B2
(45) Date of Patent: Oct. 22, 2024

(54) METHOD FOR CONTROLLING VENTILATION OF A TRANSMISSION

(71) Applicant: Volvo Truck Corporation, Gothenburg (SE)

(72) Inventors: Marcus Persson, Gothenburg (SE); Klas Bergström, Västra Frölunda (SE); Jenny Lepa, Lindome (SE); Magnus Blanckenfjell, Hisings Kärra (SE); Fredrik Karpenman, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 249 days.

(21) Appl. No.: 17/729,138

(22) Filed: Apr. 26, 2022

(65) Prior Publication Data
US 2022/0341489 A1     Oct. 27, 2022

(30) Foreign Application Priority Data

Apr. 26, 2021    (EP) ..................... 21170523

(51) Int. Cl.
*F16H 57/02*     (2012.01)
*F16H 57/027*    (2012.01)
(Continued)

(52) U.S. Cl.
CPC ....... *F16H 57/027* (2013.01); *F16H 61/0025* (2013.01); *F16H 63/3023* (2013.01); *F16H 61/30* (2013.01)

(58) Field of Classification Search
CPC ............... F16H 57/027; F16H 57/0416; F16H 61/0025; F16H 61/30; F16H 61/682; F16H 2061/0043; F16H 63/3023
See application file for complete search history.

(56) References Cited

U.S. PATENT DOCUMENTS 4,068,537 A * 1/1978 Wolfe ..................... F16H 63/36
                                              74/473.11
4,625,840 A * 12/1986 Kojima ............... F16H 61/2807
                                              192/3.61
(Continued)

FOREIGN PATENT DOCUMENTS

DE   102011002600 A1 *  7/2012  ........... F16H 57/027
EP      2395263 B1      10/2013
WO   WO-2020048700 A1 *  3/2020  ............ F15B 21/048

OTHER PUBLICATIONS

Extended European Search Report dated Sep. 23, 2021 for European Patent Application No. 21170523.1, 9 pages.

*Primary Examiner* — Adam D Rogers
(74) *Attorney, Agent, or Firm* — Sage Patent Group

(57) ABSTRACT

A transmission includes a plurality of pneumatic actuators for gear shifting, wherein the pneumatic actuators are arranged to discharge compressed air via a common ventilation system including at least one ventilation opening arranged in a housing arrangement of the transmission. A method for controlling ventilation of the transmission includes determining that a predetermined flushing condition is fulfilled and, in response thereto, initiating a flushing action in which at least two of the pneumatic actuators are controlled to discharge compressed air simultaneously or substantially simultaneously to the common ventilation system so as to force air through the at least one ventilation opening.

15 Claims, 2 Drawing Sheets

(51) Int. Cl.
    *F16H 61/00*     (2006.01)
    *F16H 61/30*     (2006.01)
    *F16H 63/30*     (2006.01)

(56) References Cited

U.S. PATENT DOCUMENTS

| | | | | |
|---|---|---|---|---|
| 5,411,450 | A * | 5/1995 | Gratton | B60W 30/19 |
| | | | | 74/335 |
| 8,166,847 | B2 * | 5/2012 | Bader | F16H 57/027 |
| | | | | 74/606 R |
| 8,667,859 | B2 * | 3/2014 | Engel | F16H 61/30 |
| | | | | 74/473.11 |
| 9,835,250 | B2 * | 12/2017 | Lygner | F16H 61/12 |
| 11,585,396 | B2 * | 2/2023 | Bilen | F16D 48/06 |
| 2020/0408264 | A1 * | 12/2020 | Jozaki | F16D 25/14 |
| 2022/0390032 | A1 * | 12/2022 | Knoke | B60T 13/683 |
| 2023/0047435 | A1 * | 2/2023 | Chamaken Kamde | |
| | | | | F16H 61/04 |

* cited by examiner

METHOD FOR CONTROLLING VENTILATION OF A TRANSMISSION

CROSS-REFERENCE TO RELATED APPLICATIONS

The present application claims benefit of priority to European Patent Application No. 21170523.1, filed Apr. 26, 2021, and is assigned to the same assignee as the present application and is incorporated herein by reference.

TECHNICAL FIELD

The disclosure relates to a method for controlling ventilation of a transmission, in particular a transmission of a vehicle. The disclosure also relates to a transmission control unit, a transmission, and a vehicle.

The disclosure can be applied in heavy-duty vehicles, such as trucks, buses and construction equipment. Although the disclosure will be described with respect to a truck, the disclosure is not restricted to this particular vehicle, but may also be used in other vehicles such as buses, trailers, wheel loaders, excavators, passenger cars, etc., and in any other application in which a transmission is used, such as in a vessel or in a motorcycle.

BACKGROUND

There are many types of power transmissions for vehicles, including manual transmissions and different types of automatic transmissions. For example, it is known to use automated manual transmissions (AMT) for e.g. trucks. The gear shifts in an AMT are commonly performed by pneumatic actuators, which are controlled by a transmission control unit. The gear shifts are initiated by the transmission control unit based on manual input from a driver and/or based on information relating to vehicle speed, acceleration, weight, road grade, torque demand etc. Each pneumatic actuator comprises a piston arranged in a cylinder having one or more pneumatic chambers connected to a compressed air system by means of valves. To initiate a gear shift, the valves are controlled to selectively pressurize the pneumatic chambers and thereby move the piston, in turn acting on e.g. a shift rod connected to a shift fork. Once a gear is engaged, the actuator is vented, and excess air is discharged from the pneumatic chamber. A ventilation system for preventing overpressure within the transmission as air is discharged from the actuators is therefore provided. The ventilation system also serves to prevent pressure fluctuations resulting from temperature variations within the transmission. The ventilation system may for example comprise ventilation openings provided in a housing in which the actuators are arranged, possibly in combination with a channel system for guiding excess air through the transmission and eventually through openings provided in a housing arrangement of the transmission. To ensure proper venting, it is important that the ventilation openings do not become clogged as a result of e.g. oil residuals and dirt.

SUMMARY

An object of the disclosure is to provide an in at least some aspect improved way of ensuring proper ventilation of a transmission. In particular, it is an object to provide a method that ensures that ventilation openings for preventing under- or overpressure within a housing arrangement of a transmission are kept open.

According to a first aspect of the disclosure, the object is achieved by a method for controlling ventilation of a transmission, such as a transmission of a vehicle.

The transmission in which the method is carried out comprises a plurality of pneumatic actuators for gear shifting, wherein the pneumatic actuators are arranged to discharge compressed air via a common ventilation system comprising at least one ventilation opening arranged in a housing arrangement of the transmission. The method comprises:

determining that a predetermined flushing condition is fulfilled; and in response thereto, initiating a flushing action in which at least two of the pneumatic actuators are controlled to discharge compressed air simultaneously or substantially simultaneously to the common ventilation system so as to force air through the at least one ventilation opening.

By the provision of a method that initiate a flushing action when a predetermined flushing condition is fulfilled, a more efficient ventilation of the transmission is provided than in transmissions that rely merely on the flushing effect achieved by the air discharged as a result of gear shifting. Since at least two of the pneumatic actuators are controlled to discharge air simultaneously, or substantially simultaneously, into the common ventilation system, a higher pressure is achieved in the ventilation system than during an ordinary gear shift, when air from a single actuator is typically discharged. Thus, a faster air flow that more efficiently blows the ventilation opening/s clean is achieved. Clogging of the at least one ventilation opening can thereby be efficiently prevented. Moreover, dirt may more efficiently be prevented from entering into the housing arrangement.

Each pneumatic actuator may comprise a cylinder in which at least one piston is arranged, delimiting two pneumatic chambers, and at least one inlet valve per chamber for introducing compressed air to initiate a movement of the at least one piston, thereby initiating a gear shift. The pneumatic actuator further comprises at least one outlet valve for discharging compressed air to the common ventilation system as a gear has been engaged. The inlet and outlet valves may of course be combined, as e.g. a three-way solenoid valve. Each pneumatic actuator may be one of a spring-return pneumatic actuator, a double-acting pneumatic actuator, or a three-position pneumatic actuator. A combination of different pneumatic actuators may be used, or all pneumatic actuators may be of the same type.

By "common ventilation system" is herein intended that the ventilation system is common for the pneumatic actuators of the transmission. In other words, all outlet valves of the pneumatic actuators emit air to a common space through which the air must flow to reach the at least one ventilation opening. The at least one ventilation opening may be arranged to fluidly connect the ventilation system, including any ducts and internal spaces forming part thereof, to an external space outside of the housing arrangement of the transmission. The ventilation system may typically comprise two or more ventilation openings.

By "substantially simultaneously" is intended that the pneumatic actuators are controlled to initiate the discharging of compressed air simultaneously within a defined tolerance, such as within a time interval shorter than or equal to a defined maximum time, such as a maximum time of 1 s, or preferably a shorter maximum time of 100 ms, 50 ms, 30 ms, 20 ms, or 10 ms.

Optionally, initiating the flushing action comprises filling the at least two pneumatic actuators to a maximum or substantially maximum pressure, and subsequently discharging the compressed air comprised therein. This may typically be performed by controlling at least one inlet valve, such as a solenoid valve, fluidly connecting the pneumatic actuators to a pneumatic system or a compressed air tank of e.g. a vehicle in which the transmission is provided. By "substantially maximum pressure" of a pneumatic actuator is intended a pressure which is within a predetermined tolerance of a defined maximum pressure of the pneumatic actuator, or of a pneumatic chamber thereof, such as a predetermined tolerance within a range of 90-99% of the defined maximum pressure. Alternatively, it may be possible to fill the at least two pneumatic actuators to a pressure which is lower than a maximum pressure, and subsequently discharging the compressed air comprised therein. For example, filling the at least two pneumatic actuators to approximately 50% of the maximum pressure may be sufficient, depending on the number of pneumatic actuators used and the size of the pneumatic actuators.

Optionally, the method comprises:

selecting at least one of the at least two pneumatic actuators to be used in the flushing action as a pneumatic actuator that may be filled to a maximum pressure without initiating a shift of gears.

In this way, the flushing can be carried out independently of a gear shift, or in connection with pressurizing at least one of the pneumatic actuators in order to initiate a gear shift. In the latter case, at least one additional pneumatic actuator, in addition to that one needed for the gear shift, is pressurized and discharged. If all of the pneumatic actuators to be used in the flushing action are selected as pneumatic actuators that may be filled to a maximum pressure without initiating a gear shift, the flushing can be carried out without affecting the currently engaged gear(s). For example, the selected pneumatic actuators may be those that can be pressurized so as to press towards a currently engaged gear.

Optionally, the method comprises:

selecting at least one of the at least two pneumatic actuators to be used in the flushing action as a pneumatic actuator having two separate pneumatic chambers that may be simultaneously filled to a maximum pressure without initiating a shift of gears.

This may be the case when the transmission is in neutral, i.e. without gear engaged, in which case two opposing pneumatic chambers, provided on opposite sides of at least one piston of the pneumatic actuator, can be pressurized to centralize the at least one piston in a middle position, defining neutral. In this case, simultaneously pressurizing and discharging both pneumatic chambers do not initiate movement of the at least one piston and consequently do not lead to a gear shift. The pneumatic actuator may be a double-acting pneumatic actuator.

Optionally, the predetermined flushing condition may be considered fulfilled when it is detected that a vehicle in which the transmission is provided has been started and/or when it is detected that the vehicle has been shut off, i.e., at starting and/or shutting off of a propulsion unit of the vehicle, such as an engine or an electric machine. The condition may e.g. be considered fulfilled when a signal is received in a control unit of the transmission that the vehicle has been started or shut off.

After use of the vehicle, the transmission cools down and contaminations may gather in the ventilation openings as air and possibly dirt is being sucked in as a result of the decreasing pressure within the housing. By initiating the flushing action after starting the vehicle, the contaminations gathered after the previous use cycle are efficiently removed.

Similarly, a flushing action performed after shutting off the vehicle removes contaminations gathered during the use cycle. The flushing action may in this case be performed within the delay between shutting off the vehicle, i.e. turning off a key or similar, and shutting down a pneumatic system of the vehicle.

Optionally, the predetermined flushing condition is considered fulfilled when it is detected that a vehicle in which the transmission is provided has been parked, such as upon activation of a parking brake of the vehicle. During parking, the vehicle might be stationary for a relatively long time and the transmission will start to cool down, even if the powertrain has not been shut off. For example, the driver may keep the engine running during parking for some reason, in which case the activation of the parking brake will initiate the flushing action regardless of whether the engine is turned off.

Optionally, the predetermined flushing condition is considered fulfilled when it is detected that a vehicle in which the transmission is provided has been operated without shifting gears, and/or without performing the flushing action, for a predetermined amount of time or a predetermined travelling distance. In this way, clogging of the ventilation opening(s) that may occur when the vehicle is operated during a relatively long time without air circulation in the transmission, normally induced by shifting gears, may be prevented. The predetermined travelling distance or amount of time may be set to a fixed value or it may be set depending on e.g. operating conditions of the vehicle, weather conditions, etc.

Optionally, the predetermined flushing condition is considered fulfilled when it is detected that a predetermined shifting operation is executed. For example, the predetermined flushing condition may be considered fulfilled when a range gear shift is carried out, since the pneumatic actuator used for shifting the range gear is typically more voluminous, i.e. has larger pneumatic chamber/s, than other actuators. Thus, an efficient flushing action may be achieved by simultaneously filling and discharging another pneumatic actuator in addition to the pneumatic actuator needed for the shifting operation.

Optionally, the pneumatic actuators have different maximum filling volumes, and the predetermined shifting operation is a shifting operation involving the pneumatic actuator having the largest maximum filling volume. An efficient flushing action may thereby be achieved while most of the compressed air used for the flushing action is also used in the gear shift. The maximum filling volume is the largest volume of a pneumatic chamber of the pneumatic actuator, i.e. the volume of the pneumatic chamber when pressurized to maximum pressure.

According to a second aspect of the disclosure, at least the primary object is also achieved by a transmission control unit configured to perform the method according to the first aspect. The transmission control unit may be intended for use in a vehicle. The transmission control unit preferably comprises hardware or hardware and software configured for controlling the pneumatic actuators, and more specifically for controlling the valves thereof. Advantages and advantageous features of the transmission control unit appear from the above description of the first aspect of the disclosure.

According to a third aspect of the disclosure, a transmission is provided, comprising:

a plurality of pneumatic actuators for gear shifting, a common ventilation system comprising at least one ventilation opening arranged in a housing arrangement of the transmission, via which common ventilation system the pneumatic actuators are arranged to discharge compressed air to an external space outside of the housing arrangement, a transmission control unit according to the second aspect. The transmission may be intended for use in a vehicle.

Optionally, the at least one ventilation opening is arranged to fluidly connect the ventilation system to the external space. The at least one ventilation opening may for example be a through-hole provided in the housing arrangement enclosing the pneumatic actuators and/or the gears of the transmission. The at least one ventilation opening may be arranged to fluidly connect the ventilation system, including any ducts and internal spaces forming part thereof, to the external space.

Optionally, the housing arrangement delimits at least a first space into which outlet valves of the pneumatic actuators open, and a second space in which gears are arranged, wherein the ventilation system fluidly connects the first space, the second space and the external space. Thereby, the flushing action may induce an air flow through the second space in which the gears are arranged. Thus, the ventilation system is configured to provide an air flow from/to the first space, in which the pneumatic actuators are arranged or at least in which the outlet valves thereof open, via the second space, and to/from the external space via the ventilation hole/s, thereby flushing out dirt and contaminations preventing efficient ventilation of the transmission. The ventilation hole/s may be provided either in an external wall of the first space or of the second space. The first space and the second space may be separate from each other and fluidly connected only via the ventilation system.

Optionally, the ventilation system fluidly connects the first space to the external space via the second space, so that the flushing action induces an airflow through the second space. Thereby, the flushing action forces air into the second space and further through the ventilation hole/s. The external wall comprising the ventilation hole/s may in this case be an external wall delimiting the second space in which gears are arranged. Thus, the ventilation system is herein configured to provide an air flow from/to the first space, in which the pneumatic actuators are arranged, via the second space, and to/from the external space via the ventilation hole/s.

Preferably, the transmission is an automated transmission, wherein the gear shifts are automatically performed by use of the pneumatic actuators. The pneumatic actuators are preferably controlled by the transmission control unit.

The disclosure also relates to a vehicle comprising the transmission according to the third aspect. The vehicle may be any type of vehicle as disclosed herein, but is preferably a heavy-duty vehicle, such as a heavy-duty truck.

The vehicle may comprise a main propulsion unit, such as an internal combustion engine, ICE, forming part of a powertrain of the vehicle. It shall be noted that the vehicle may be a hybrid vehicle, comprising at least two different propulsion units, such as an ICE and at least one electric motor, or a fully electric vehicle comprising one or more electric motors. The propulsion unit(s) of the vehicle may use any type of fuel or energy source, such as diesel, gasoline, natural gas and/or batteries, fuel cells etc.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings.

Figure 1:
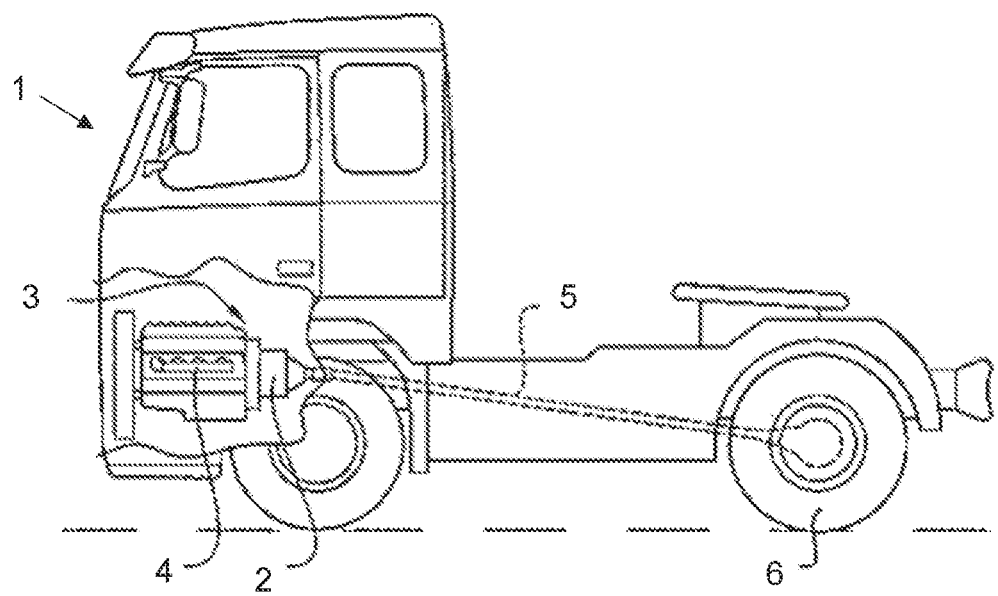
FIG. 1 is a side view of a vehicle in which a method according to the disclosure may be applied.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise.

DETAILED DESCRIPTION OF EXAMPLE EMBODIMENTS

FIG. 1 depicts a vehicle 1 according to an example embodiment of an aspect of the present disclosure. The vehicle 1 is here a heavy-duty truck, more specifically a towing truck, or tractor, for pulling one or more trailers (not shown). As mentioned in the above, the vehicle may be any type of vehicle, including but not limited to buses, wheel loaders, excavators, passenger cars etc.

The vehicle 1 comprises a powertrain 3 with a propulsion unit 4, which here is an internal combustion engine (ICE), and a transmission 2 according to an example embodiment of the third aspect of the disclosure drivingly connected to the propulsion unit 4. The vehicle 1 further comprises a propulsion shaft 5 which drivingly connects the transmission 1 to drive wheels 6 of the vehicle 1. The drive wheels 6 are here the rear wheels of the truck 1. The propulsion shaft 5 is drivingly connected to the drive wheels 6 via e.g. a differential (not shown). Even though drive wheels 6 are shown in this embodiment, it shall be understood that any other type of ground engaging means may be used, such as crawler members of an excavator.

Figure 2:
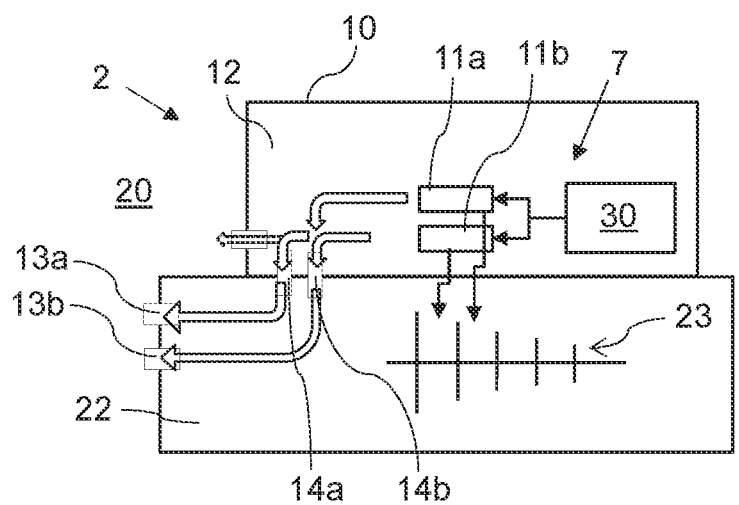
FIG. 2 is a schematic drawing of a transmission according to a first embodiment of the disclosure.

FIG. 2 schematically illustrates a transmission 2 according to an embodiment of the disclosure, in which a method according to the first aspect may be applied. The transmission 2 comprises in the illustrated embodiment a housing arrangement 10 delimiting the transmission 2 and its components from an external space 20 outside of the housing arrangement 10. A first space 12 of the housing arrangement 10 encloses a gear 35 changing device 7 for controlling gear shifting. The gear changing device 7 comprises two pneumatic actuators 11a, 11b for actuating shift rods (not shown) so as to effectuate gear shifts. This is in FIG. 2 schematically illustrated by arrows. The gear changing device 7 further comprises an electronic transmission control unit 30 for controlling valves of the pneumatic actuators 11a, 11b in response to gear shifting signals. A set of gears 23 and other mechanical components of the transmission 2, such as shafts, shift forks, synchronizers etc., not illustrated in FIG. 2, are provided in a second space 22 of the housing arrangement 10.

The pneumatic actuators 11a, 11b are arranged to discharge compressed air via a common ventilation system comprising two ventilation openings 13a, 13b arranged in an external wall of the housing arrangement 10, thus fluidly connecting the inside of the housing arrangement 10 with the external space 20. In the illustrated embodiment, the ventilation openings 13a, 13b are provided in an external wall delimiting the second space 22, with two internal ventilation openings 14a, 14b fluidly connecting the first space 12 and the second space 22. Air discharged by the pneumatic actuators 11a, 11b thus follow a path illustrated by the arrows, from the first space 12 to the external space 20 via the second space 22. However, the ventilation system may be configured in many different ways with e.g. external opening/s provided in an external wall delimiting the first space 12, as illustrated by the dashed arrow in FIG. 2, and/or with various internal ducts or channels fluidly connecting the spaces 12, 22, as long as a flow path is created that allows air discharged from the pneumatic actuators 11a, 11b to escape via one or more ventilation openings into the external space 20. The ventilation system should also be configured so that a pressure equalization between the first and second spaces 12, 22 and the external space 20 is enabled, which is achieved by fluidly connecting the different spaces. The ventilation system may be formed with narrow passages that increase the flow velocity through the ventilation openings 13a, 13b.

In some embodiments, the housing arrangement 10 may comprise a basic housing in which at least one group of gears, such as a splitter group and a main group of gears, are arranged, and a range housing in which a range group of gears is arranged. A gear changing system may be arranged as a cover mounted on the basic housing, wherein a bottom section of the gear changing system, comprising e.g. the shift forks, reaches into the second space 22 to mechanically shift gears. Cylinders of the pneumatic actuators 11a, 11b may also form part of the bottom section of the gear changing system, while e.g. valves, pressure sensor/s, and pneumatic and electrical connections of the gear changing system may be arranged in a cover thereof, also comprising the electronic transmission control unit 30. Thus, the housing arrangement 10 may comprise several internal spaces, that may be fluidly connected by means of the ventilation system.

Although in the illustrated embodiment two pneumatic actuators 11a, 11b are provided, the transmission 2 may of course comprise a larger number of pneumatic actuators depending on the configuration of the transmission 2. For example, three, four, five or six pneumatic actuators may be provided. The pneumatic actuators may be single-acting (spring-return) or double-acting pneumatic actuators, or three-position pneumatic actuators. All pneumatic actuators may be identical, or they may differ in for example cylinder size, i.e., filling volume, and/or actuator type. For example, a pneumatic actuator for selecting a range gear may have a larger cylinder than a pneumatic actuator for selecting a main gear. Typically, four double-acting pneumatic actuators may be used.

Figure 3:
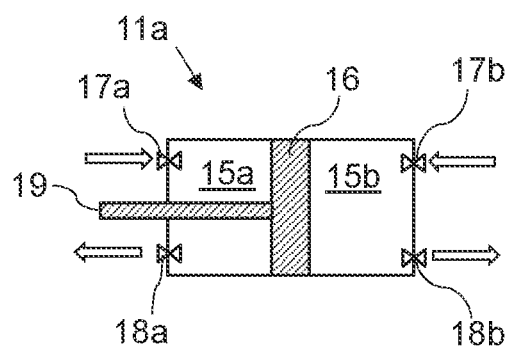
FIG. 3 is a schematic drawing of a pneumatic actuator that may be used in a method according to the disclosure, FIG. 4 schematically illustrates parts of a transmission according to a second embodiment of the disclosure.

FIG. 3 schematically illustrates an example embodiment of the pneumatic actuator 11a in more detail. The pneumatic actuator 11a is herein a double-acting pneumatic actuator comprising a first pneumatic chamber 15a, a second pneumatic chamber 15b, and a piston 16 mechanically connected to a shift rod 19 provided therebetween. Each pneumatic chamber 15a, 15b has a variable volume. Inlet valves 17a, 17b fluidly connect each one of the pneumatic chambers 15a, 15b to a pneumatic system of the vehicle, i.e. to a compressed air supply, and outlet valves 18a, 18b are provided for discharging air from the pneumatic chambers 15a, 15b, respectively. The transmission control unit 30 controls the inlet and outlet valves 17a, 17b, 18a, 18b. To initiate a gear shift, one of the pneumatic chambers 15a, 15b is pressurized via the inlet valve 17a, 17b to act on the piston 16 and thereby move the shift rod 19. In FIG. 3, the piston 16 is shown in a middle position, which typically corresponds to a neutral position of the transmission 2.

Figure 4:
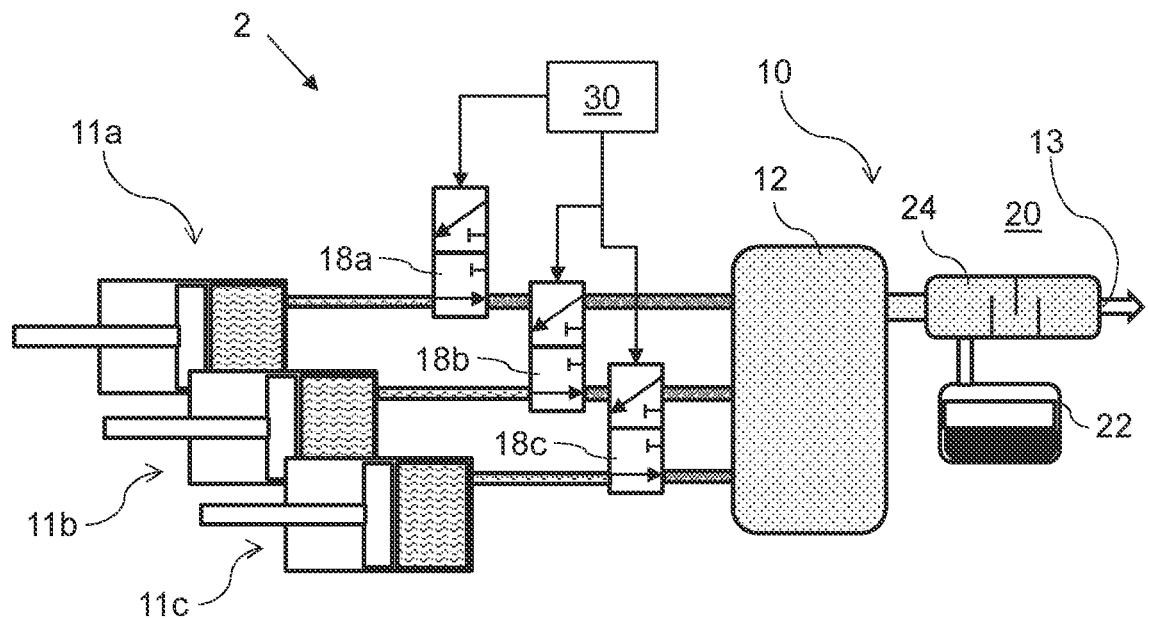

FIG. 4 illustrates parts of a transmission 2 according to another embodiment of the disclosure, in which three pneumatic actuators 11a, 11b, 11c are provided, each having a pneumatic chamber with a respective outlet valve 18a, 18b, 18c selectively connecting the pneumatic chambers to a first space 12, such as an internal volume of the gear changing device 7. A ventilation system comprising an air duct 24 and one or more ventilation openings 13 fluidly connects the first space 12, a second space 22 in which the gears are arranged together with lubricating oil, and an external space 20. A housing arrangement encloses the first space 12, the second space 22 and the air duct 24. During a flushing action, two or three of the pneumatic actuators 11a, 11b, 11c may be pressurized and subsequently discharged to achieve an air flow that cleans the ventilation opening/s 13. A transmission control unit 30 is provided for controlling operation of the valves 18a, 18b, 18c, and also of inlet valves (not shown in FIG. 4) of the pneumatic actuators 11a, 11b, 11c. As described above with reference to FIG. 2, the ventilation system and the housing arrangement 10 may have many different configurations as long as a flow path is created that allows air discharged from the pneumatic actuators 11a, 11b, 11c to escape via one or more ventilation openings 13 into the external space 20.

Figure 5:
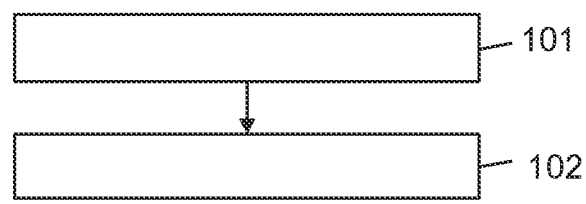
FIG. 5 is a flow chart illustrating a method according to an embodiment of the first aspect of the disclosure.

FIG. 5 illustrates a method according to an embodiment of the first aspect of the disclosure. The method may be carried out by the electronic transmission control unit 30 illustrated in FIG. 3 or FIG. 4, controlling the inlet valves and outlet valves of the pneumatic actuators 11a, 11b, 11c, and comprises the following steps:

Step 101: Determining that a predetermined flushing condition is fulfilled. This may be determined based on signals and/or data received in the electronic transmission control unit 30 from various sensors, control units and/or systems of the vehicle. The flushing condition may e.g. be defined so that it is considered fulfilled when at least one of the following is valid:
  a) It is detected that the vehicle 1 in which the transmission 2 is provided has been started. Typically, the transmission 2 is in neutral when this condition applies.
  b) It is detected that the vehicle 1 has been shut off. Typically, the transmission 2 is in neutral when this condition applies.
  c) It is detected that the vehicle 1 has been parked, such as upon activation of a parking brake of the vehicle 1, or when a predetermined time has elapsed after activation of the parking brake. Typically, the transmission 2 is in neutral when this condition applies.
  d) It is detected that the vehicle 1 has been operated without shifting gears for a predetermined amount of time or a predetermined travelling distance.
  e) It is detected that the vehicle 1 has been operated without performing the flushing action for a predetermined amount of time or a predetermined travelling distance.
  f) It is detected that a predetermined shifting operation is executed, such as a shifting operation involving a predetermined pneumatic actuator, such as a pneumatic actuator having a pneumatic chamber with a particularly large filling volume in comparison with the other actuators of the transmission 2. Typically, this condition may be considered fulfilled when the range gear is shifted to low range.

g) A predetermined number of gear shifts have been performed without performing a flushing action.

h) It is detected that a temperature of the transmission has decreased by more than a predetermined threshold.

i) It is detected that a shifting operation to a reverse gear is executed.

j) It is detected that a start gear has been engaged for a predetermined amount of time.

Step 102: In response to the predetermined flushing condition being fulfilled, initiating a flushing action in which at least two of the pneumatic actuators 11a, 11b, 11c are controlled to discharge compressed air simultaneously or substantially simultaneously to the common ventilation system so as to force air through the ventilation openings 13, 13a, 13b. The flushing action may be initiated by filling the pneumatic actuators 11a, 11b, 11c to a maximum or substantially maximum pressure, and subsequently discharging the compressed air comprised therein. Thus, a larger volume of air is forced through the ventilation system than during an ordinary gear shift of the transmission 2, thereby more efficiently removing for example dirt and oil residuals clogging the ventilation openings 13, 13a, 13b, and also preventing dirt from entering into the housing arrangement 10.

If the predetermined flushing condition is not considered fulfilled, no flushing action is initiated.

Of the two or more pneumatic actuators 11a, 11b, 11c to be used in the flushing action, at least one may be selected as a pneumatic actuator that may be filled to a maximum pressure without initiating a shift of gears. In the case when a gear is engaged, the pneumatic chamber that, when pressurized, presses the piston 16 and thereby the shift rod 19 towards the engaged gear position may be selected. When the transmission 2 is in a neutral position with the piston 16 in a middle position as illustrated in FIG. 3, both pneumatic chambers 15a, 15b may be filled to a maximum pressure and subsequently simultaneously discharged without initiating a gear shift, since pressure will be exerted on the piston 16 from both sides.

The electronic transmission control unit 30 may include a microprocessor, a microcontroller, a programmable digital signal processor or another programmable device. Thus, the electronic transmission control unit 30 comprises electronic circuits and connections (not shown) as well as processing circuitry (not shown) such that the electronic transmission control unit 30 can communicate with different parts of the vehicle 1 or with different control units of the vehicle 1, such as with various sensors, systems and control units, in particular with one or more electronic control units (ECUs) controlling electrical systems or subsystems in the vehicle, such as an engine control unit. The electronic transmission control unit 30 may comprise modules in either hardware or software, or partially in hardware or software, and communicate using known transmission buses such a CAN-bus and/or wireless communication capabilities. The processing circuitry may be a general-purpose processor or a specific processor. The electronic transmission control unit 30 comprises a non-transitory memory for storing computer program code and data. Thus, the skilled person realizes that the electronic transmission control unit 30 may be embodied by many different constructions.

It is to be understood that the present disclosure is not limited to the embodiments described above and illustrated in the drawings; rather, the skilled person will recognize that many changes and modifications may be made within the scope of the appended claims.

The invention claimed is:

1. A method for controlling ventilation of a transmission, the transmission comprising:
    a plurality of pneumatic actuators for gear shifting, wherein the pneumatic actuators are arranged to discharge compressed air via a common ventilation system comprising at least one ventilation opening arranged in a housing arrangement of the transmission, the method comprising:
    determining that a predetermined flushing condition is fulfilled; and
    in response thereto, initiating a flushing action in which at least two of the pneumatic actuators are controlled to discharge compressed air simultaneously or substantially simultaneously to the common ventilation system so as to force air through the at least one ventilation opening.

2. The method according to claim 1, wherein initiating the flushing action comprises filling the at least two pneumatic actuators to a maximum or substantially maximum pressure, and subsequently discharging the compressed air comprised therein.

3. The method according to claim 1, comprising:
    selecting at least one of the at least two pneumatic actuators to be used in the flushing action as a pneumatic actuator that may be filled to a maximum pressure without initiating a shift of gears.

4. The method according to claim 1, comprising:
    selecting at least one of the at least two pneumatic actuators to be used in the flushing action as a pneumatic actuator having two separate pneumatic chambers that may be simultaneously filled to a maximum pressure without initiating a shift of gears.

5. The method according to claim 1, wherein the predetermined flushing condition is considered fulfilled when it is detected that a vehicle in which the transmission is provided has been started and/or when it is detected that the vehicle has been shut off.

6. The method according to claim 1, wherein the predetermined flushing condition is considered fulfilled when it is detected that a vehicle in which the transmission is provided has been parked, such as upon activation of a parking brake of the vehicle.

7. The method according to claim 1, wherein the predetermined flushing condition is considered fulfilled when it is detected that a vehicle in which the transmission is provided has been operated without shifting gears, and/or without performing the flushing action, for a predetermined amount of time or a predetermined travelling distance.

8. The method according to claim 1, wherein the predetermined flushing condition is considered fulfilled when it is detected that a predetermined shifting operation is executed.

9. The method according to claim 8, wherein the pneumatic actuators have different maximum filling volumes, and the predetermined shifting operation is a shifting operation involving the pneumatic actuator having the largest maximum filling volume.

10. A transmission control unit configured to perform the method according to claim 1.

11. A transmission comprising:
    a plurality of pneumatic actuators for gear shifting,
    a common ventilation system comprising at least one ventilation opening arranged in a housing arrangement of the transmission, via the pneumatic actuators being arranged to discharge compressed air to an external space outside of the housing arrangement via the common ventilation system,
a transmission control unit according to claim 10.

12. The transmission according to claim 11, wherein the at least one ventilation opening is arranged to fluidly connect the ventilation system to the external space.

13. The transmission according to claim 11, wherein the housing arrangement delimits at least a first space into which outlet valves of the pneumatic actuators open, and a second space in which gears are arranged, and wherein the ventilation system fluidly connects the first space, the second space and the external space.

14. The transmission according to claim 13, wherein the ventilation system fluidly connects the first space to the external space via the second space, so that the flushing action induces an airflow through the second space.

15. A vehicle comprising the transmission according to claim 11.

\* \* \* \* \*